(12) United States Patent
Weichholdt

(10) Patent No.: US 7,416,482 B2
(45) Date of Patent: Aug. 26, 2008

(54) COMBINE HARVESTER BLOWER HAVING CONVEX WIND CHANNEL SIDE WALLS

(75) Inventor: Dirk Weichholdt, Sarreguemines (FR)

(73) Assignee: Deere & Company, Moline, IL (US)

( * ) Notice: Subject to any disclaimer, the term of this patent is extended or adjusted under 35 U.S.C. 154(b) by 34 days.

(21) Appl. No.: 11/451,824

(22) Filed: Jun. 13, 2006

(65) Prior Publication Data

US 2006/0287018 A1 Dec. 21, 2006

(30) Foreign Application Priority Data

Jun. 16, 2005 (DE) .................. 10 2005 027 726

(51) Int. Cl.
*A01F 12/48* (2006.01)
*B07B 1/55* (2006.01)
*B08B 5/00* (2006.01)
(52) U.S. Cl. ....................................... 460/99
(58) Field of Classification Search ............... 460/99, 460/100, 98, 97, 115; 406/105, 117, 139; 209/317, 318
See application file for complete search history.

(56) References Cited

U.S. PATENT DOCUMENTS

| 2,849,118 | A | * | 8/1958 | Ashton ........................ 209/318 |
| 2,954,123 | A | * | 9/1960 | Gaunt et al. .................. 209/21 |
| 3,043,427 | A | | 7/1962 | Eisert |
| 3,049,128 | A | * | 8/1962 | Hing et al. .................... 460/85 |
| 3,374,886 | A | | 3/1968 | Lightsey |
| 4,303,079 | A | * | 12/1981 | Claas et al. .................. 460/99 |
| 4,511,466 | A | | 4/1985 | Jones et al. |
| 6,053,812 | A | | 4/2000 | Loewen et al. |

FOREIGN PATENT DOCUMENTS

| DE | 1 607 633 | 2/1967 |
| DE | 14 03 495 B | 1/1969 |
| DE | 1403495 A1 | 1/1969 |
| DE | 2423917 A1 | 11/1975 |
| DE | 30 42 734 | 11/1980 |
| DE | 29 22 607 C2 | 1/1981 |
| DE | 29222607 A1 | 1/1981 |
| DE | 43 25 310 | 7/1993 |
| DE | 19501828 A1 | 7/1996 |
| DE | 102 46 858 A1 | 5/2004 |
| EP | 06 83 970 A2 | 5/1995 |
| EP | 1 068 793 | 6/2000 |
| EP | 1407656 A | 4/2004 |
| FR | 2 549 345 | 7/1984 |

OTHER PUBLICATIONS

European Search Report, Nov. 10, 2006, (4 pages).
German Search Report, Nov. 14, 2006, (4 pages).
European Search Report, Oct. 24, 2006, 5 Pages.

* cited by examiner

*Primary Examiner*—Árpád Fábián-Kovács

(57) ABSTRACT

The invention relates to a radial blower for a cleaning device for a combine harvester, with several component blowers, where each of the blowers is arranged in an associated housing, each of which is connected to a wind duct that during operation guides the air stream generated by the component blower to the cleaning device, wherein the wind ducts have side walls that are connected with convex curvature to the side walls of the housing of the component blowers and wherein the side walls of adjacent wind ducts are connected to each other at the end facing toward the cleaning device, in which the side walls of the wind duct have a convex curvature over their length.

6 Claims, 2 Drawing Sheets

COMBINE HARVESTER BLOWER HAVING CONVEX WIND CHANNEL SIDE WALLS

FIELD OF THE INVENTION

The invention relates to a radial blower for a cleaning device for a combine harvester, with several component blowers, where each of the blowers is arranged in an associated housing, each of which is connected to a wind duct that during operation guides the air stream generated by the component blower to the cleaning device, wherein the wind ducts have side walls that are connected with a convex curvature to the side walls of the housing of the component blowers, and wherein the side walls of adjacent wind ducts are connected to each other at the end facing toward the cleaning device.

BACKGROUND OF THE INVENTION

Radial blowers are used for applying air streams to sieves and optionally to cascading sieves in the cleaning devices of self-propelled combine harvesters. The air stream allows a separation of the heavy grains from lighter particles, such as chaff, and it should have as-even-as-possible an intensity over the width of the cleaning device, so that the desired cleaning effect can be achieved over the entire width of the sieves.

Besides radial blowers with a housing that extends over the width of the cleaning device in which several paddles attached on a rotating shaft are circumferentially offset from each other (DE 504 189 A), or with paddles that extend nearly over the width of the housing (EP 1 389 416 A), radial blowers have been proposed that consist of several component blowers arranged next to each other in separate housings. The component blowers comprise paddles arranged on a shaft that passes through all the housings. The housings have lateral inlet openings that are adjacent to the shaft and wind ducts that radially from the paddles towards the cleaning device.

Such a radial blower is described in DE 29 22 607 C. The side walls of the wind ducts extend in a straight line outward and form an obtuse angle with the lateral housing walls in each case, so that the cross section of the wind ducts broadens to form a funnel toward the cleaning. Adjacent side walls of the wind ducts are connected to each other by short front walls. The front walls are absent in DE 24 23 917 A and U.S. Pat. No. 2,954,123 A because there the side walls of the wind ducts are connected directly to each other.

In DE 14 03 495 A, which is considered to be the generic case, the side walls of the wind ducts broaden outward in the shape of an S. The side walls of the wind ducts are connected with a convex curvature to the side walls of the housing of the component blower. The convex curvature then transitions, approximately in the middle of the length of the side walls of the wind ducts, into a concave curvature, so that the mentioned S shape is produced. The front walls are omitted because the ends of the side walls are connected directly to each other. This arrangement is said to have been designed using fluidics.

To further improve the evenness of the transverse distribution of the intensity of the wind, DE 102 46 858 A proposes to extend the side walls of the wind ducts in a straight-line extension of the side walls of the associated blower housing, and to connect the adjacent side walls of the wind ducts to each other by a front surface that extends at a right angle from the side walls of the associated blower housing. In embodiments, radii are provided in the connection area between the side walls of the wind ducts and the front wall, or the front surface is designed in a shape of an arc of a circle.

SUMMARY OF THE INVENTION

The problem which is the basis of the invention is to provide an improved radial blower for a cleaning device of a combine harvester, which blower allows further improvement of the evenness of the lateral distribution of the generated air stream.

This problem is solved according to the invention by the teaching of claim 1, whereby the characteristics that are listed in the additional claims further develop the solution in an advantageous manner.

It is proposed to use a convex design for the side walls of the wind duct over its entire length, that is, from the end of the side wall of the housing of the component blower up to the place where the side wall of the wind duct is connected directly to a side wall of an adjacent wind duct or to a front wall with which the side wall of the adjacent wind duct is in turn connected. The outer side walls of the outer wind ducts can also be connected to a side wall of the frame of the combine harvester.

There are thus no pointed stall edges in the wind ducts at which undesired vortexes could form. The wind ducts broaden continuously outward, so that the air stream at the downstream end of the wind ducts is relatively wide, allowing the wind streams of adjacent component blowers to combine without vortex formation. The outwardly curved shape of the side walls therefore turns out to be particularly advantageous from the fluidics standpoint to generate as-homogeneous-as-possible a wind distribution over the width of the cleaning device.

The side walls of adjacent wind ducts, as already mentioned, can be connected to each other directly or by a front wall. In the latter case, the front wall can be designed flat and extend parallel to the rotation axis of the blower rotors, or it can be bent to a convex curvature like the side walls of the wind ducts.

BRIEF DESCRIPTION OF THE DRAWINGS

The drawings show an embodiment of the invention that is described in greater detail below. In the drawings.

DESCRIPTION OF THE PREFERRED EMBODIMENT

Figure 1:
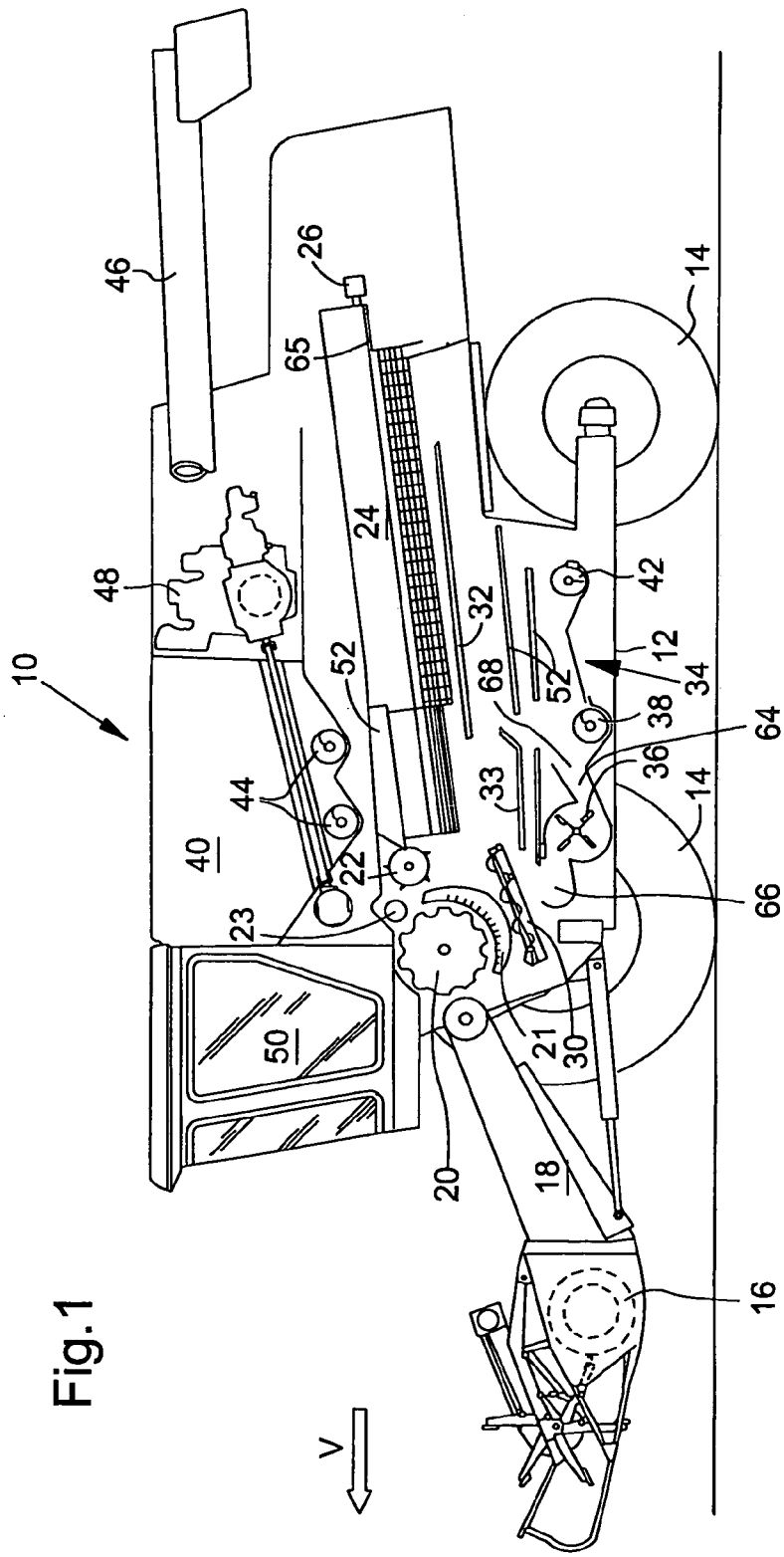
FIG. 1 shows a schematic side view of a combine harvester with a cleaning device.

FIG. 1 shows a self-propelled combine harvester 10 with a frame 12, which rests on wheels 14 on the ground and is moved by the latter. The wheels 14 are set into rotation by means of a not-shown driving system, and these move the combine harvester 10, for example, over a field to be harvested.

In the front end area of the combine harvester 10 a crop-collection device 16 is connected in the form of a cutting system to remove the crop from the field and to lead it up and back through a diagonal conveyor 18 to threshing and separating means. The threshing and separating means comprise a diagonally arranged threshing drum 20 and a threshing basket 21, associated with the latter, to which the harvested material is led first. However, it is also conceivable to replace the threshing drum 20 with a multiple-drum threshing device, or to omit it and use an axial separator that has a threshing section and a separating section. It is possible to use a single axial separator, or two (or more) axial separators arranged next to each other. An unwinding roller 23 and a deflection drum 22 together with a feed housing lead the threshed crop from the threshing drum 20 and the threshing basket 21 to the separation device 24, which is in the form of an axial separator. The separation device 24 is driven at its back side by a driving system 26 that is connected so that it can be driven by a combustion engine 48. It is also possible to use a straw shaker as separation device 24. In what follows, all directions, such as front, back, upper and lower, are indicated with reference to the forward movement direction V of the combine harvester 10.

Grain and chaff that are separated during the threshing process, fall onto at least one screw conveyor 30 that leads the two materials to a preparation floor 33. Grain and chaff that, on the other hand, exit from the separation device 24, fall onto a shaking floor 32, which passes them on to be conducted to the preparation floor 33. The preparation floor 33 passes the grain and the chaff to a cleaning device 34 with sieves 52 that are arranged on top of each other in a sieve box. The cleaning device 34 is associated with a radial blower 36 to support the separation of the grain from the hay. Cleaned grains are led by means of a grain screw 38 to a not-shown elevator, which conveys it into a grain tank 40. A tailings screw 42 returns incompletely threshed ears through an additional elevator, not shown, back to the threshing process. The chaff can be ejected at the back side of the sieving device by a rotating chaff distributor. The cleaned grain from the grain tank 40 can be unloaded by an unloading system with transverse screws 44 and an unloading conveyor 46.

The mentioned systems are driven by a combustion engine 48 and controlled and commanded by the operator from a driver cabin 50. The different devices for threshing, conveying, cleaning, and separating are located within the frame 12. An external shell, most of which can be flipped is provided outside of the frame 12.

Threshed crop residues (straw) are ejected downward from separation device 24 through an outlet 65 on the bottom side of the back end of the housing of separation device 24, which is closed in the back. They can be led to a straw chopper (not shown).

The radial blower 36 for the cleaning device 34 of the combine harvester 10 comprises several radial component blowers 54, which are arranged on a common, continuous blower shaft 56 and motively connected in a known manner to the combustion engine 48. The blower turbine 58 of each component blower 54 is surrounded by a separate housing 60 with an air suction opening 62, located in the area of the blower shaft 56, which opening is connected tangentially to a wind duct 64 and, in the present embodiment, a secondary duct 66 (see FIGS. 1 and 3). The sieves 52 of the cleaning device 34, which are adjacent to the wind duct outlet 68, receive via the wind ducts 64 the flow of required cleaning air that is used both for the fine cleaning of the cereal crop and also for discharging contaminants in the form of short straw fragments and chaff. An additional cleaning air stream is deflected in a known manner through the secondary duct 66, which stream is led, for example, to a first cascade save to clean the mixture of cereal, short straw fragments and chaff coming from the preparation floor 33.

The housings 60 comprise the side walls 70, which are provided with the air suction openings 62 and extend parallel to each other and perpendicularly to the blower shaft 56, and which in each case cover the blower turbines 58 from the side and end approximately at the radial external margin of the blower turbines 58. In each case the side walls 72 of the wind duct 64, which delimit the air duct 64 laterally and guide the air stream, are connected to the side walls 70 of the housings 60. The side walls 72 in the transitional area are connected without steps, and with a relatively large curvature radius, to the side walls 70 and they have a convex shape over their entire length up to a front wall 74 that is toward the wind duct exit 68; that is, their external contour is curved outward. The front wall 74 also has a convex curvature. At its center it runs parallel to the blower shaft 56. The curvature radius of the side wall 72 can be 500 mm, for example. From the fluidics standpoint, it has been shown that the shape with outward curvature of the side walls 72 of the wind duct 64 is particularly advantageous for achieving an even transverse distribution of wind intensities during the sieving 52.

Figure 2:
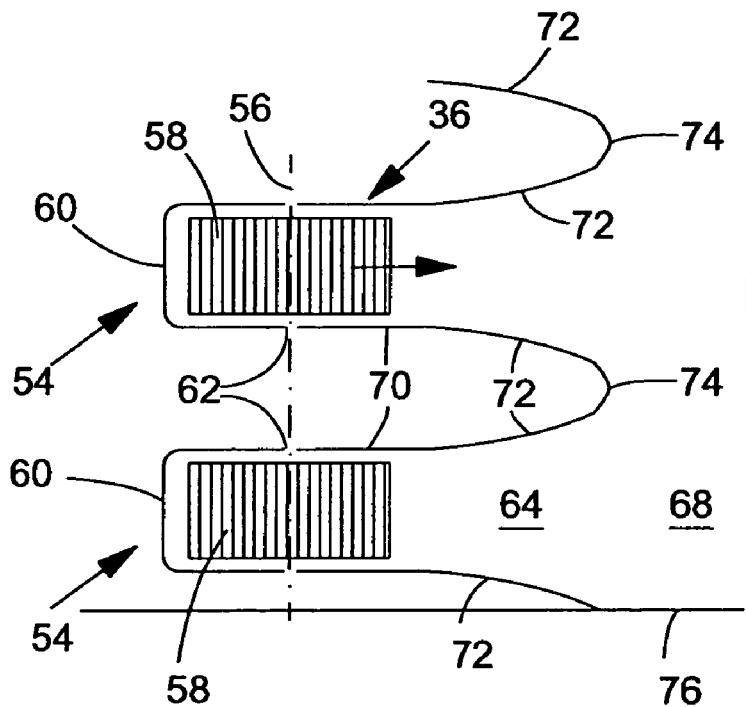
FIG. 2 shows a partially sectioned top view of the radial blower of the cleaning device of the combine harvester from FIG. 1.
Figure 3:
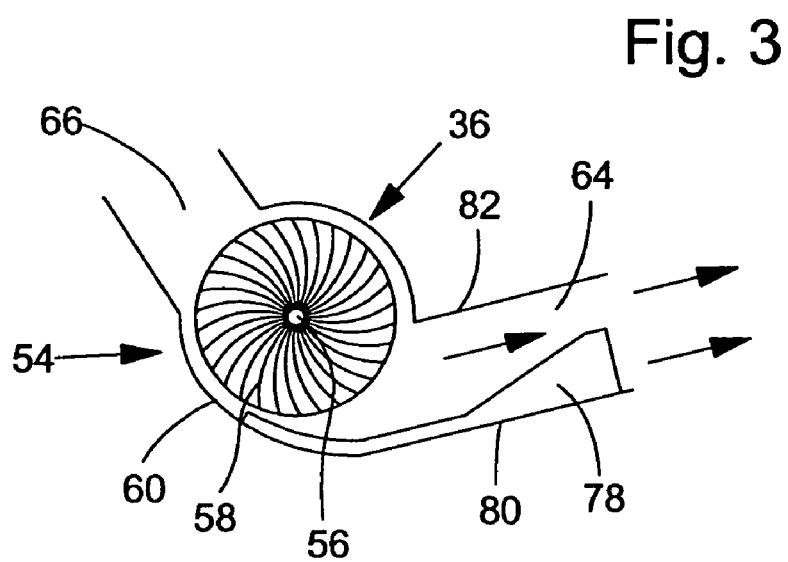
FIG. 3 shows a partially sectioned side view of the radial blower from FIG. 2.

The side walls 72 of the wind ducts 64 extend vertically between a bottom metal sheet 80 and a cover metal sheet 82 of the wind ducts 64. The front wall 74, which is drawn at the bottom of FIG. 2, abuts the side wall 76 of the frame 12 of the combine harvester 10. As can be seen in FIG. 3, metal vertical air guidance sheets 78 are located on the bottom metal sheet 80 of the wind duct 64, and they extend along the central axis of the wind ducts 64.

Having described the preferred embodiment, it will become apparent that various modifications can be made without departing from the scope of the invention as defined in the accompanying claims.

The invention claimed is:

1. A radial blower for a cleaning device for a combine harvester, with several component blowers, where each one of the blowers is arranged in an associated housing, each of which is connected to a wind duct that during operation, guides the air stream generated by the component blower to the cleaning device, wherein the wind ducts have side walls that are connected with convex curvature to the side walls of the housing of the component blowers, and wherein the side walls of adjacent wind ducts are connected to each other at the end facing toward the cleaning device, wherein the side walls of the wind duct have a stepless convex curvature over their entire length.

2. The radial blower according to claim 1, wherein the side walls of adjacent wind ducts are connected to each other at the end facing toward the cleaning device by a front wall that is one of a flat and a convex curvature.

3. A cleaning device for cleaning grain in a combine harvester, the improvement comprising a radial blower with several component blowers, where each one of the blowers is arranged in an associated housing, each one of the blowers is connected to a wind duct that during operation, guides the air stream generated by said each component blower to the cleaning device, wherein the wind ducts have side walls that are connected with convex curvature to the side walls of the housing of the component blowers, and wherein the side walls of adjacent wind ducts are connected to each other at the end facing toward the cleaning device, wherein the side walls of the wind duct have a stepless convex curvature over their entire length.

4. The cleaning device according to claim 3, wherein the side walls of adjacent wind ducts are connected to each other at the end facing toward the cleaning device by a front wall that is one of a flat and a convex curvature.

5. A combine harvester for harvesting grain, having a frame, an engine supported on the frame, wheels supporting the frame, a threshing system, a separating system and a crop cleaning device, wherein the improvement comprises a radial blower for the cleaning device, the radial blower having several component blowers, where each one of the blowers is arranged in an associated housing, each of which is connected to a wind duct that during operation, guides the air stream generated by the component blower to the cleaning device, wherein the wind ducts have side walls that are connected with convex curvature to the side walls of the housing of the component blowers, and wherein the side walls of adjacent wind ducts are connected to each other at the end facing toward the cleaning device, wherein the side walls of the wind duct have a stepless convex curvature over their entire length.

6. The harvester according to claim 5, wherein the side walls of adjacent wind ducts are connected to each other at the end facing toward the cleaning device by a front wall that is one of a flat and a convex curvature.

* * * * *